Feb. 4, 1969   M. J. McCULLOUGH   3,425,447
GAS-DUCT VALVE WITH FLEXIBLE CLOSURE
Filed Dec. 10, 1965
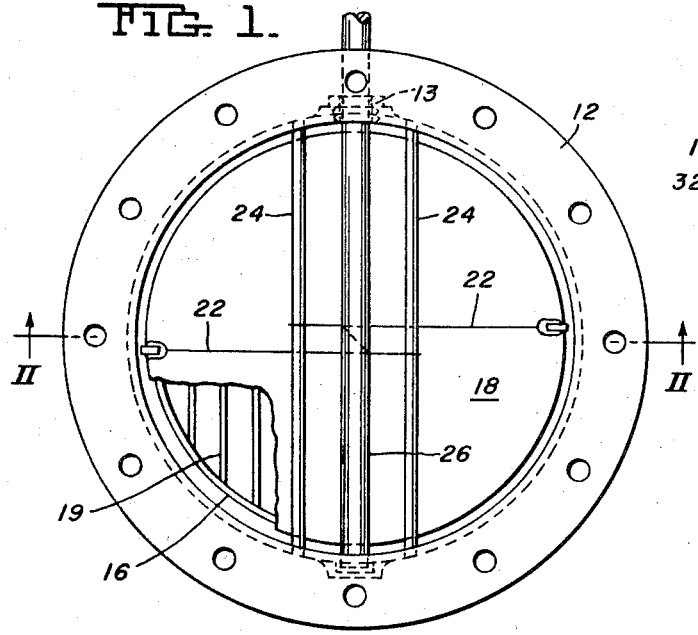
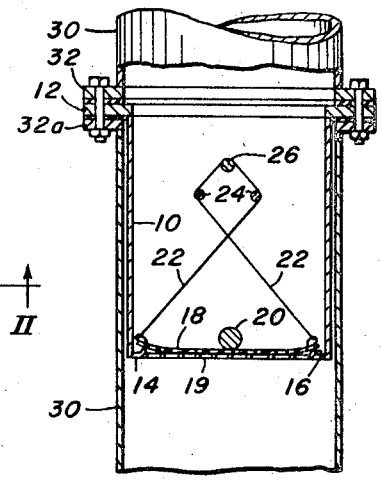
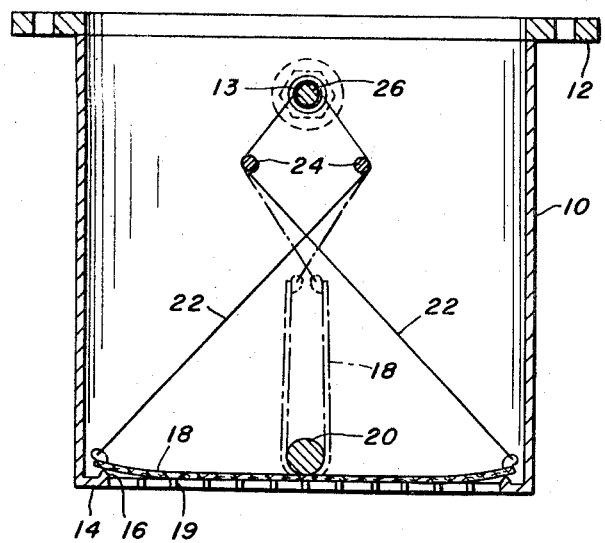
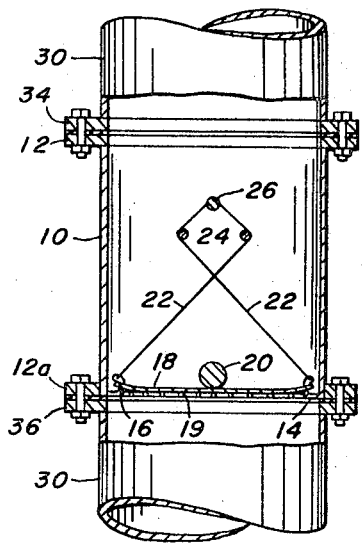
INVENTOR.
MARSHALL J. McCULLOUGH
By Donald G. Dalton
Attorney

United States Patent Office 3,425,447
Patented Feb. 4, 1969

3,425,447
GAS-DUCT VALVE WITH FLEXIBLE CLOSURE
Marshall J. McCullough, Chicago, Ill., assignor to United States Steel Corporation, a corporation of Delaware
Filed Dec. 10, 1965, Ser. No. 513,001
U.S. Cl. 137—625.12                2 Claims
Int. Cl. F16k 7/14, 1/34, 31/52

ABSTRACT OF THE DISCLOSURE

A valve comprising a housing defining a passageway and a knife edge valve plate seat disposed around the interior of the housing, a flexible valve plate adapted for positioning within the housing so that it will engage the knife edge valve plate seat in a gas-tight relationship. Means are also provided to support the valve plate when in the closed position and to fold the flexible valve plate about a restraining means to open the valve.

---

The present invention relates to a valve that provides a gas-tight seal. More particularly, the invention relates to a valve for use in vacuum lines in which dirt and dust in the atmosphere potentially present a problem to the operation of vacuum valves.

In certain environments, such as in vacuum casting operations, the presence of dirt or other foreign material is unavoidable. Yet it is necessary to maintain gas-tight seals during evacuation and to employ uncomplicated valves with minimum of components. In addition, the valves used must be capable of operating efficiently even in contaminated atmospheres containing dirt and other particulate material. In vacuum casting, for example, an evacuated chamber is employed into which molten metal is introduced for degassing. The gases evolved during this operation cause large amounts of dirt to deposit in the lines connecting the vacuum chamber with the pumps. Thus, the valves must be frequently removed for cleaning.

It has been found that the necessity of removal of the valve for cleaning arises largely from failure of the valve plate to make a gas-tight seal with the valve plate seat. The present invention avoids the aforementioned difficulties by providing a flexible valve plate and a projecting, preferably metallic, knife edge valve plate seat for the valve plate. In this manner, dirt accumulation at the seat is substantially avoided since the periphery of the valve plate is substantially beyond the knife edge seat and close to the wall of the evacuation line or the cartridge in which the valve is constructed.

Dampers having hinged semi-circular segments and some that are provided with pull chains or flexible discs have been known to the art. However, such structures are unsatisfactory since they will not provide adequate gas-tight seals particularly in the presence of dirt deposits around the valve seat. An essential feature of the invention is the use of the knife edge seat of a hard material against which the resilient or flexible valve plate projects.

According to the invention, there is provided a valve adaptable for use in a vacuum line which comprises a housing and a knife edge valve plate seat which is fixedly positioned within the housing. The housing is hollow and a passageway is provided through it. The valve plate seat surrounds the passageway through the interior of the housing. A flexible valve plate is also disposed within the housing and is adaptable to engage the valve plate seat in a gas-tight relationship. Since the valve plate is flexible, means are provided to support it when the valve is in the closed position. The valve is also equipped with means to restrain a portion of the flexible valve plate and means to fold the flexible valve plate about the restraining means in order to open the valve. To open the valve, lifting means fastened to the flexible valve plate at opposite ends thereof are provided. A rotatable shaft is provided to which the lifting means are fastened in such a way that rotation of the shaft in one direction causes the lifting means to fold the flexible valve plate about the restraining means and thereby open the valve. Rotation in the opposite direction permits the flexible valve plate to seat on the valve plate seat and thereby close the valve.

The invention can be more fully understood by reference to the accompanying drawings in which:

FIGURE 1 is a plan view of a valve assembly constructed in accordance with the invention;

FIGURE 2 is a sectional view of the valve taken along lines II—II of FIGURE 1; and FIGURES 3 and 4 are elevational views, partly in section, illustrating two embodiments of the present invention.

As can be seen, the valve assembly is housed in a cylindrical cartridge 10 having a top outwardly extending flange 12 by which it may be mounted on a coupling flange (see FIGURES 3 and 4) at an end of a pipe section. At the bottom end of cartridge 10 is an inwardly extending flange 14 which includes a projecting knife edge valve plate seat 16 of annular configuration. A grid 19 is positioned at the bottom end of cartridge 10 across flange 14. A flexible valve plate or closure 18 constructed of resilient material such as conventional fiber reinforcement belting is disposed so as to sit on the knife edge 16 on flange 14 and be supported on grid 19 when the valve is closed. The flexible valve plate 18 extends beyond the knife edge 16 and close to the interior of the cylindrical cartridge 10.

Across the diameter of the cartridge is extended a member 20 connected at each end to the wall of cartridge 10. The member 20 is provided to permit the flexible valve plate to be folded therearound to open the valve. Wire ropes 22 are connected by fasteners 19 to the edge of the flexible valve plate at two opposite points and the wire rope is strung around two guide bars 24 and wound around a rotatable shaft 26 journaled in the cylindrical cartridge 10 and hermetically sealed thereto at the end which extends through the housing 10 by a suitable packing joint 13. By rotation of the shaft 26 either mechanically or manually, the flexible valve plate may be folded along member 20 and the valve thereby brought to the open position as indicated by the dotted lines in FIGURE 2. Rotation of the shaft 26 in the opposite direction causes the rope 22 to unwind and bring the flexible valve plate to the closed position supported on grid 19 and in seating relation with the knife edge 16.

The two embodiments of the invention shown in FIGURES 3 and 4 illustrate how the vacuum valve may be variously adapted for use in vacuum lines. In the example shown in FIGURE 3, the vacuum valve housing 10 is inserted in a vacuum line duct 30 and is fastened thereto by connection of flange 12 to connecting flanges 32 and 32a of the vacuum line duct 30 and with suitable gaskets therebetween. In this embodiment, provision must be made in the vacuum line duct for the extension of shaft 26 therethrough.

The embodiment shown in FIGURE 4 illustrates a simple manner of incorporating the vacuum valve into an existing vacuum line. In this embodiment, a section of vacuum line duct 30 is removed and the housing 10 of the vacuum valve is provided with connecting flanges at both ends thereof which are used to mount the valve within the line. As shown, connecting flanges 12 and 12a are bolted to flanges 34 and 36 of the vacuum line duct.

The valve plate, as discussed above, can be constructed of any resilient material such as the fabric reinforced rubber normally used in conveyor belting. It is only necessary to cut the material to size to conform to the interior configuration of the valve. The annular knife edge seat is preferably constructed as an annular, machined section which can then be welded to the cylindrical housing 10. It is necessary that the valve plate seat or knife edge be constructed of a hard material which will not dull readily and, for this reason, machined metallic sections are preferred. The fastener 19 to which the cables 22 are connected can be glued to the valve plate or otherwise joined thereto.

It is also apparent that other configurations and enclosures may be accommodated with a valve assembly of the type described herein. It is important only that a combination of a flexible valve plate closure and a knife edge therefor be provided. It is also apparent that various arrangements for folding the flexible valve plate may be used. Although the valve is particularly useful in vacuum lines as described herein, it is apparent that the valve may be used in any gas line.

I claim:
1. A valve adaptable for use in a vacuum line comprising a housing, a knife edge valve plate seat fixedly positioned within said housing and surrounding a passageway therethrough, a flexible valve plate disposed within said housing and adapted to engage said valve plate seat in a gas-tight relationship, means to support said flexible valve plate when said valve is in the closed position, means to restrain a portion of said flexible valve plate and means to fold said flexible valve plate about said last named means to open said valve.

2. A valve according to claim 1 including lifting means fastened to said flexible valve plate at opposite ends thereof, and a rotatable shaft to which said lifting means are fastened, whereby rotation of said shaft in one direction causes said lifting means to fold said flexible valve plate about said restraining means to open said valve and rotation of said shaft in the opposite direction permits said flexible valve plate to seat and close said valve.

References Cited

UNITED STATES PATENTS

| | | | |
|---|---|---|---|
| 70,511 | 11/1867 | Bourden | 137—625.3 X |
| 1,606,278 | 11/1926 | Weaton | 251—294 X |
| 2,483,401 | 10/1949 | Cole | 251—294 X |
| 2,890,716 | 6/1959 | Werder | 137—512.15 |
| 3,000,395 | 9/1961 | Waterfill | 137—525 X |
| 3,092,130 | 6/1963 | Hewitt | 137—525 X |
| 3,292,657 | 12/1966 | Reynolds | 137—512.15 |

ARNOLD ROSENTHAL, *Primary Examiner.*

U.S. Cl. X.R.

137—625.28; 251—294